United States Patent
Mori et al.

(10) Patent No.: US 6,657,014 B1
(45) Date of Patent: Dec. 2, 2003

(54) CROSSLINKABLE RUBBER COMPOSITION AND CROSSLINKED OBJECT

(75) Inventors: Osamu Mori, Tokyo (JP); Takafumi Kawanaka, Kawasaki (JP); Yoshiaki Aimura, Kawasaki (JP); Hiroyuki Kotsuji, Kawasaki (JP); Haruhiko Fujita, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/049,612

(22) PCT Filed: Aug. 21, 2000

(86) PCT No.: PCT/JP00/05586
§ 371 (c)(1),
(2), (4) Date: Feb. 20, 2002

(87) PCT Pub. No.: WO01/14469
PCT Pub. Date: Mar. 1, 2001

(30) Foreign Application Priority Data

Aug. 20, 1999 (JP) ............................................. 11-233539

(51) Int. Cl.$^7$ ............................ C08L 9/02; C08L 33/04; C08K 5/17; C08K 5/31
(52) U.S. Cl. ............................... 525/329.3; 525/328.3; 525/381; 525/382; 525/194
(58) Field of Search ............................ 525/329.3, 328.3, 525/381, 382, 194

(56) References Cited

U.S. PATENT DOCUMENTS

| | | | | | |
|---|---|---|---|---|---|
| 5,651,995 | A | * | 7/1997 | Oyama et al. | ............... 524/565 |
| 5,683,819 | A | * | 11/1997 | Mori et al. | .................. 428/500 |
| 5,830,941 | A | * | 11/1998 | Aimura et al. | ............... 524/456 |
| 5,852,093 | A | * | 12/1998 | Aimura et al. | ............... 524/432 |
| 6,410,653 | B1 | * | 6/2002 | Fujii et al. | ................... 525/285 |

* cited by examiner

Primary Examiner—D. R. Wilson
(74) Attorney, Agent, or Firm—Armstrong, Westerman & Hattori, LLP

(57) ABSTRACT

A crosslinkable rubber composition comprising (a) 100 weight parts of a nitrile group-containing highly saturated copolymer rubber containing units of an ethlenically unsaturated dicarboxylic acid monoalkyl ester monomer, (b) 0.5 to 10 parts by weight of a polyamine crosslinking agent, and (c) 0.5 to 10 parts by weight of a basic crosslinking accelerator. This rubber composition gives a crosslinked nitrile group-containing highly saturated copolymer rubber article having excellent heat resistance, flex fatigue resistance and elongation, and reduced permanent set.

17 Claims, No Drawings

CROSSLINKABLE RUBBER COMPOSITION AND CROSSLINKED OBJECT

TECHNICAL FIELD

This invention relates to a crosslinked rubber article having high heat resistance, high flex fatigue resistance, good elongation and low permanent set, and to a rubber composition capable of being crosslinked with steam and giving the crosslinked rubber article.

BACKGROUND ART

A nitrile group-containing highly saturated copolymer rubber is hitherto known as exhibiting good heat resistance, oil resistance and ozone resistance. A crosslinked article of the nitrile group-containing highly saturated copolymer rubber is used for various automobile parts such as a timing belt, a hose, a gasket, a packing and an oil seal. To develop a high-compact and high-powered engine, a rubber material having higher heat resistance is eagerly desired.

Among automobile parts, hoses are generally made by a process wherein an uncrosslinkable article prepared by extrusion of rubber material is subjected to steaming in a vulcanizer to be thereby crosslinked. When a highly saturated nitrile rubber having a sulfur crosslinking agent incorporated therein is used as a material for hoses, the resulting hoses have poor heat resistance and low mechanical strength. In contrast, when a highly saturated nitrile rubber having an organic peroxide crosslinking agent incorporated therein is used, a problem arises such that radicals of an organic peroxide is deactivated upon contact with air, and thus, there is a great difference in degree of crosslinking between the surface part of crosslinked hose and the inner part thereof. Consequently, a crosslinked rubber hose having high performance cannot be obtained with steam-crosslinking conducted after shaping.

When a highly saturated nitrile rubber is crosslinked with an organic peroxide crosslinking agent, a crosslinked rubber article having a reduced permanent set can be obtained. However, when the crosslinked rubber article has a hollow shape having cavity in the center such as o-ring, the reduction of permanent set is minor.

DISCLOSURE OF THE INVENTION

A primary object of the present invention is to provide a crosslinked article made of a nitrile group-containing highly saturated copolymer rubber having high heat resistance, high flex fatigue resistance, good elongation and low permanent set.

The present inventors carried out experimental research into crosslinking conditions of nitrile group-containing highly saturated copolymer rubber, and found that, when a nitrile group-containing highly saturated copolymer rubber having units of an ethylenically unsaturated dicarboxylic acid monoalkyl ester monomer is crosslinked with a polyamine crosslinking agent in the presence of a basic crosslinking accelerator, a crosslinked rubber article having desired good properties can be obtained. Based on this finding, the present invention has been completed.

Thus, in accordance with the present invention, there is provided a crosslinkable rubber composition comprising (a) 100 parts by weight of a nitrile group-containing highly saturated copolymer rubber containing units of an ethylenically unsaturated dicarboxylic acid monoalkyl ester monomer, (b) 0.5 to 10 parts by weight of a polyamine crosslinking agent, and (c) 0.5 to 10 parts by weight of a basic crosslinking accelerator.

In accordance with the present invention, there is further provided a crosslinkable rubber composition comprising (a) 100 parts by weight of a nitrile group-containing highly saturated copolymer rubber containing units of an ethylenically unsaturated dicarboxylic acid monoalkyl ester monomer, (d) 10 to 90 parts by weight of an acrylic rubber, (b) 0.5 to 10 parts by weight of a polyamine crosslinking agent, and (c) 0.5 to 10 parts by weight of a basic crosslinking agent, wherein said amounts of the polyamine crosslinking agent (b) and the basic crosslinking agent (c) are based on 100 parts by weight of the sum of the nitrile group-containing highly saturated copolymer rubber (a) and the acrylic rubber (d).

Further, the present invention provides a crosslinked rubber article made by crosslinking a crosslinkable rubber composition.

BEST MODE FOR CARRYING OUT THE INVENTION

Crosslinkable Rubber Composition (1)

The crosslinkable rubber composition (1) of the present invention comprises (a) 100 parts by weight of a nitrile group-containing highly saturated copolymer rubber containing units of an ethylenically unsaturated dicarboxylic acid monoalkyl ester monomer, (b) 0.5 to 10 parts by weight of a polyamine crosslinking agent, and (c) 0.5 to 10 parts by weight of a basic crosslinking accelerator.

[Nitrile Group-Containing Highly Saturated Copolymer Rubber]

The nitrile group-containing highly saturated copolymer rubber containing units of an ethylenically unsaturated dicarboxylic acid monoalkyl ester monomer (a) is (i) a rubber comprising ethylenically unsaturated dicarboxylic acid monoalkyl ester monomer units, $\alpha,\beta$-ethylenically unsaturated nitrile monomer units, $\alpha$-olefin monomer or diene monomer units, and optional units of other monomer copolymerizable therewith, or (ii) a rubber made of hydrogenating unsaturated bonds of the diene monomer units contained in the rubber (i).

The ethylenically unsaturated dicarboxylic acid monoalkyl ester monomer is an ester compound made from an ethylenically unsaturated dicarboxylic acid and an aliphatic alcohol. The ethylenically unsaturated dicarboxylic acid preferably has not larger than 5 carbon atoms, and, as specific examples thereof, there can be mentioned maleic acid, fumaric acid and itaconic acid. The aliphatic alcohol constituting the ester compound preferably has not larger than 5 carbon atoms. An aliphatic alcohol having a greater number of carbon atoms tends to give a copolymer rubber having a low rate of crosslinking and giving a crosslinked product having poor physical properties.

As specific examples of the ethylenically unsaturated dicarboxylic acid monoalkyl ester monomer, there can be mentioned maleic acid monoalkyl esters such as maleic acid monomethyl ester, maleic acid monoethyl ester, maleic acid mono-n-propyl ester, maleic acid monoisopropyl ester, maleic acid mono-n-butyl ester and maleic acid monoisobutyl ester; fumaric acid monoalkyl esters such as fumaric acid monomethyl ester, fumaric acid monoethyl ester, fumaric acid monopropyl ester and fumaric acid mono-n-butyl ester; and itaconic acid monoalkyl esters such as itaconic acid monomethyl ester, itaconic acid monoethyl ester, itaconic acid monopropyl ester and itaconic acid mono-n-butyl ester. Itaconic acid mono-n-butyl ester is especially preferable.

The content of ethylenically unsaturated dicarboxylic acid monoalkyl ester units in the nitrile group-containing highly saturated copolymer rubber (a) is preferably in the range of 0.5% to 15% by weight, more preferably 1% to 10% by weight and especially preferably 2% to 5% by weight. When this content is too small, the copolymer is liable to have reduced crosslinkability. In contrast, if this content is too large, a crosslinked rubber article tends to have poor water resistance because of residual carboxyl group in the crosslinked rubber article.

As preferable examples of the $\alpha,\beta$-ethylenically unsaturated nitrile monomer, there can be mentioned acrylonitrile, methacrylonitrile and $\alpha$-chloroacrylonitrile. Acrylonitrile is especially preferable. The content of $\alpha,\beta$-ethylenically unsaturated nitrile monomer units in the nitrile group-containing highly saturated copolymer rubber (a) is preferably in the range of 10% to 60% by weight, more preferably 15% to 55% by weight and especially preferably 20% to 50% by weight. When this content is too small, a crosslinked rubber article is liable to have poor oil resistance. In contrast, if this content is too large, a crosslinked rubber article is liable to have poor cold resistance.

The $\alpha$-olefin monomer preferably has 2 to 12 carbon atoms, and, as specific examples thereof, there can be mentioned ethylene, propylene, 1-butene, 4-methyl-1-pentene, 1-hexene and 1-octene.

As specific examples of the diene monomer, there can be mentioned conjugated diene monomers having at least four carbon atoms such as 1,3-butene, isoprene, 2,3-dimethyl-1,3-butadiene and 1,3-pentadiene; and non-conjugated diene monomers preferably having 5 to 12 carbon atoms such as 1,4-pentadiene and 1,4-hexadiene.

The content of diene monomer units or $\alpha$-olefin monomer units in the nitrile group-containing highly saturated copolymer rubber (a) is preferably in the range of 25% to 85% by weight, more preferably 35% to 80% by weight and especially preferably 45% to 75% by weight. If the content of diene monomer units is too small, the rubber elasticity tends to be deteriorated. In contrast, if this content is too large, the heat resistance and chemical stability are liable to become poor. Even if the content of diene monomer units is in this range, when this content is relatively large, the iodine value occasionally becomes too large. In this case, unsaturated bonds of the backbone chain of diene monomer units should be saturated by hydrogenation as mentioned above.

The optional monomer copolymerizable with $\alpha,\beta$-ethylenically unsaturated nitrile monomer and other monomers includes, for example, ethylenically unsaturated carboxylic acid esters other than the ethylenically unsaturated dicarboxylic acid monoalkyl ester, vinyl monomers, ethylenically unsaturated polycarboxylic acid anhydrides, and copolymerizable age registers.

As specific examples of the ethylenically unsaturated carboxylic acid esters other than the ethlenically unsaturated dicarboxylic acid monoalkyl ester, there can be mentioned methyl acrylate, ethyl acrylate, n-dodecyl acrylate, methyl methacrylate, ethyl methacrylate, methoxymethyl acrylate, methoxyethyl methacryalate, $\alpha$-cyanoethyl acrylate, $\beta$-cyanoethyl acrylate, cyanobutyl methacrylate, hydroxyethyl acrylate, hydroxypropyl acrylate, dimethyl maleate, dimethyl fumarate, dimethyl itaconate, diethyl itaconate, dimethylaminomethyl acrylate, diethylaminoethyl acrylate, trifluoroethyl acrylate, tetrafluoropropyl methacrylate and fluorobenzyl acrylate.

As specific examples of the vinyl monomers (other than the above-recited ethylenically unsaturated carboxylic acid esters), there can be mentioned aromatic vinyl monomers such as styrene, $\alpha$-methylstyrene and vinylpyridine; fluorine-containing vinyl monomers such as fluoroethyl vinyl ether, fluoropropyl vinyl ether, difluoroethylene and tetrafluoroethylene; and fluorine-containing aromatic vinyl monomers (which are one kind of aromatic vinyl monomer and one kind of fluorine-containing vinyl monomer) such as o-trifluoromethylstyrene and vinyl pentafluorobenzoate.

As specific examples of the ethlenically unsaturated polycarboxylic acid anhydrides, there can be mentioned maleic anhydride and citraconic anhydride.

As specific examples of the copolymerizable age registers, there can be mentioned 4-(4-anilinophenyl) acrylamide, N-(4-anilinophenyl)methacrylamide, N-(4-anilinophenyl)cinnamamide, N-(4-anilinophenyl) crotonamide, N-phenyl-4-(3-vinylbenzyloxy)aniline and N-phenyl-4-(4-vinylbenzyloxy)aniline.

These copolymerizable monomers may be used as a combination of at least two thereof.

The nitrile group-containing highly saturated copolymer rubber (a) used in the present invention preferably has a Mooney viscosity [ML(1+4), 100° C.] in the range of 15 to 200, more preferably 30 to 150 and especially preferably 45 to 100. When the Mooney viscosity is too small, a crosslinked rubber product has poor mechanical strength. In contrast, when the Mooney viscosity is too large, the rubber composition has poor processability.

The nitrile group-containing highly saturated copolymer rubber (a) preferably has an iodine value of not larger than 120, more preferably not larger than 80 and especially preferably not larger than 40. Too high iodine value gives a crosslinked rubber article exhibiting reduced resistance to aging in hot air.

[Polyamine Crosslinking Agent (b)]

The polyamine crosslinking agent (b) used in the present invention is a compound having at least two amino groups and having a structure such that at least two hydrogen atoms of an aliphatic hydrocarbon or an aromatic hydrocarbon have been substituted by amino groups or structures represented by the formula —CONHNH$_2$. As specific examples of the polyamine crosslinking agent (b), there can be mentioned aliphatic polyamines such as hexamethylenediamine, hexamethylenediamine carbamate, tetramethylenepentamine, a hexamethylenediamine-cinnamaldehyde addition product and a hexamethylenediamine-dibenzoate salt; aromatic polyamines such as 4,4'-methylenedianiline, 4,4'-oxydiphenylamine, m-phenylenediamine, p-phenylenediamine and 4,4'-methylenebis(o-chloroaniline); and compounds having at least two structures represented by the formula —CONHNH$_2$ such as isophthalic acid dihydrazide, adipic acid dihydrazide and sebacic acid dihydrazide.

The content of polyamine crosslinking agent (b) in the rubber composition is in the range of 0.5 to 10 parts by weight, preferably 1 to 7.5 parts by weight and especially preferably 2 to 5 parts by weight, based on 100 parts by weight of the nitrile group-containing highly saturated copolymer rubber (a). When the amount of polyamine crosslinking agent (b) is too small, the crosslinking rate and the crosslinking density are liable to be reduced. In contrast, when this amount is too large, a rubber composition tends to have reduced storage stability, and exhibit too high crosslinking density and sometimes gives a brittle crosslinked rubber article.

[Basic Crosslinking Accelerator (c)]

In the present invention, a basic crosslinking accelerator (c) is used as a crosslinking auxiliary. As specific examples of the crosslinking accelerator (c), there can be mentioned guanidine crosslinking accelerators such as tetramethylguanidine, tetraethylguanidine, diphenylguanidine, di-o-tolylguanidine, o-tolylbiguanide and a di-o-tolylguanidine salt of dicathecolboric acid; and aldehydeamine crosslinking accelerators such as n-butylaldehydeaniline, acetaldehydeammonia and hexamethylenetetramine. Of these, guanidine crosslinking accelerators are preferable.

The content of basic crosslinking accelerator (c) in the rubber composition is in the range of 0.5 to 10 parts by weight, preferably 1 to 7.5 parts by weight and especially preferably 2 to 5 parts by weight, based on 100 parts by weight of the nitrile group-containing highly saturated copolymer rubber (a). When the amount of basic crosslinking accelerator (c) is too small, the crosslinking rate is liable to become low and the crosslinking density is sometime reduced. In contrast, when this amount is too large, the crosslinking rate tends to become too high, and scorch is liable to occur and storage stability is occasionally deteriorated.

[Other Ingredients]

According to the need, various ingredients can be incorporated in addition to the above-mentioned ingredients in the rubber composition (1) of the present invention provided that the object of the present invention can be substantially achieved. Such ingredients include, for example, a reinforcing agent, a filler, an age resister, an antioxidant, a light stabilizer, a scorch retarder, a plasticizer, a processing aid, a lubricant, an adhesive mass, a slipping agent, a flame-retardant, a mildew proofing agent, an antistatic agent, a colorant, a sulfur-containing crosslinking agent, an organic peroxide crosslinking agent, a crosslinking auxiliary other than basic crosslinking accelerator (b), and a crosslinking retardant.

Various rubbers, elastomers and/or resins can be incorporated in addition to the above-mentioned ingredients in the rubber composition (1) of the present invention provided that the object of the present invention can be substantially achieved. As specific examples of such ingredients, there can be mentioned olefin elastomer, styrene elastomer, vinyl chloride elastomer, polyester elastomer, polyamide elastomer, polyurethane elastomer, polysiloxane elastomer, natural rubber, polybutadiene rubber, polyisoprene rubber, styrene-butadiene rubber, acrylonitrile-butadiene rubber and chloroprene rubber. Further, crosslinking agents, crosslinking accelerators and other crosslinking auxiliaries, which are used for crosslinking these rubbers, elastomers and resins, can be incorporated.

Crosslinkable Rubber Composition (2)

The rubber composition (2) of the present invention comprises (a) 100 parts by weight of a nitrile group-containing highly saturated copolymer rubber containing units of an ethylenically unsaturated dicarboxylic acid monoalkyl ester monomer; (d) 10 to 90 parts by weight of an acrylic rubber; and, based on 100 parts by weight of the sum of the nitrile group-containing highly saturated copolymer rubber (a) and the acrylic rubber (d), (b) 0.5 to 10 parts by weight of a polyamine crosslinking agent and (c) 0.5 to 10 parts by weight of a basic crosslinking agent. This rubber composition (2) having an acrylic rubber (d) incorporated therein gives a crosslinked rubber article characterized in that, even when it has a hollow shape having cavity in the center such as o-ring, it exhibits a reduced permanent set to a considerable extent, and the oil resistance and heat resistance are excellent.

[Nitrile Group-Containing Highly Saturated Copolymer Rubber (a)]

The nitrile group-containing highly saturated copolymer rubber (a) containing units of an ethylenically unsaturated dicarboxylic acid monoalkyl ester monomer, incorporated in the rubber composition (2), is the same as the nitrile group-containing highly saturated copolymer rubber (a) incorporated in the rubber composition (1).

[Acrylic Rubber (d)]

The acrylic rubber (d) used in the present invention is a rubber containing acrylic acid ester monomer units and crosslinkable monomer units. The total amount of the acrylic acid ester monomer units and the crosslinkable monomer units is preferably at least 70% by weight, more preferably at least 80% by weight and especially preferably at least 90% by weight, based on the acrylic rubber (d).

The amount of the acrylic acid ester monomer units, based on the sum of the acrylic acid ester monomer units and the crosslinking monomer units, is preferably in the range of 90% to 99.5% by weight and more preferably 95% to 99% by weight, and the amount of the crosslinking monomer units is preferably in the range of 0.5% to 10% by weight and more preferably 1% to 5% by weight. If the relative amount of the acrylic acid ester monomer units is too large, the crosslinkability tends to be reduced. In contrast, if the relative amount of the acrylic acid ester monomer units is too small, a crosslinked rubber composition occasionally exhibits poor mechanical strength and elongation.

Preferably, the acrylic acid ester monomer units in the acrylic rubber (d) consist of acrylic acid alkyl ester monomer units and acrylic acid alkoxyalkyl ester monomer units, and do not contain other acrylic acid ester monomer units. The relative amount of the acrylic acid alkyl ester monomer units to the sum of the acrylic acid alkyl ester monomer units and the acrylic acid alkoxyalkyl ester monomer units is preferably in the range of 40% to 90% by weight and more preferably 50% to 80% by weight. When the relative amount of the acrylic acid alkyl ester monomer units is too small, the heat resistance is liable to be poor. In contrast, when the relative amount of the acrylic acid alkyl ester monomer units is too large, the cold resistance is liable to be poor.

The acrylic acid alkyl ester monomer usually has 1 to 8 carbon atoms and preferably 2 to 4 carbon atoms and, as specific examples thereof, there can be mentioned methyl acrylate, ethyl acrylate, propyl acrylate and butyl acrylate.

The acrylic acid alkoxyalkyl ester monomer preferably has 2 to 8 carbon atoms and, as specific examples thereof, there can be mentioned methoxymethyl acrylate, methoxyethyl acrylate, ethoxyethyl acrylate and butoxyethyl acrylate.

As specific examples of the crosslinking monomer, there can be mentioned active chlorine group-containing unsaturated monomers such as vinyl chloroacetate, vinylbenzyl chloride, allyl cloroacetate, vinyl chlorobutyrate, 2-chloroethyl acrylate, 3-chloropropyl acrylate, 4-chlorobutyl acrylate, 2-chloroethyl methacrylate, 2-chloroethyl vinyl ether, chloromethyl vinyl ketone, 1-chloro-2-butyl acrylate, 5-chloromethyl-2-norbornene, 5-chloroacetoxymethyl-2-norbornene and 5-($\alpha,\beta$-dichloropropionylmethyl)-2-norbornene; epoxy group-containing monomers which include unsaturated glycidyl ester monomers such as glycidyl acrylate, glycidyl methacrylate, diglycidyl itaconate, triglycidyl butenetricarboxylate and glycidyl p-styrenecarboxylate, and unsaturated glycidyl ether monomers such as vinyl glycidyl ether, allyl glycidyl ether and methacryl glycidyl ether; unsaturated monocarboxylic acid monomers such as acrylic acid, methacrylic acid, itaconic acid, maleic acid, fumaric acid, 2-norbornene-5-carboxylic acid and monomethyl maleate; unsaturated carboxylic acid anhydrides such as maleic anhydride and citraconic anhydride; and diene monomers such as butadiene, isoprene, cyclopentadiene, methylcyclopentadiene, ethylidenenorbornene and vinylnorbornene.

When an active chlorine group-containing monomer, an epoxy group-containing monomer or a carboxyl group-containing monomer among the above-recited crosslinking monomers is copolymerized for an acrylic rubber (d), the resulting crosslinked rubber article exhibits a reduced permanent set to a great extent even when it has a hollow shape having cavity in the center such as o-ring.

Provided that the object of the present invention can be achieved, other monomers may be copolymerized with the acrylic acid ester monomer and the crosslinking monomer. Such other monomers include ethylenically unsaturated monomers other than the above-mentioned acrylic acid ester monomer and crosslinking monomer, and, as specific examples thereof, there can be mentioned ethylene, acrylonitrile, vinyl acetate, styrene, α-methylstyrene, acrylamide, polyalkylene glycol acrylate, methyl methacrylate and methacrylonitrile. The amount of these monomer units in the acrylic rubber (d) is preferably not larger than 30% by weight, more preferably not larger than 20% by weight and especially preferably not larger than 10% by weight.

A process for producing the acrylic rubber (d) is not particularly limited and an ordinary process may be employed. For example, using a radical initiator including persulfate salts such as potassium persulfate and ammonia persulfate, and organic peroxides such as cumene hydroperoxide, an emulsion polymerization, suspension polymerization, solution polymerization or bulk polymerization process can be employed. The polymerization can be carried out either a batchwise manner or while one or more kinds of monomers are added continuously or intermittently. The polymerization temperature is preferably in the range of 0 to 100° C. and more preferably 2 to 80° C.

The acrylic rubber (d) used in the present invention preferably has a Mooney viscosity [ML(1+4), 100° C.] in the range of 10 to 100, more preferably 20 to 80 and especially preferably 30 to 60. When the Mooney viscosity is too small, a crosslinked rubber product has poor mechanical strength. In contrast, when the Mooney viscosity is too large, a rubber composition has poor processability.

The amount of acrylic rubber (d) in the rubber composition (2) is preferably in the range of 10 to 90 parts by weight, more preferably 15 to 85 parts by weight and especially preferably 20 to 80 parts by weight, based on 100 parts by weight of the nitrile group-containing highly saturated copolymer rubber. When the amount of acrylic rubber (d) is too small, a hollow shaped rubber article has a large permanent set as well as poor oil resistance and heat resistance. In contrast, when the amount of acrylic rubber (d) is too large, a shaped rubber article has poor mechanical strength.

[Polyamine Crosslinking Agent (b)]

The polyamine crosslinking agent (b) incorporated in the crosslinkable rubber composition (2) is the same as that in crosslinkable resin composition (1).

The amount of polyamine crosslinking agent (b) in the crosslinkable rubber composition (2) is in the range of 0.5 to 10 parts by weight, preferably 1 to 7.5 parts by weight and especially preferably 2 to 5 parts by weight, based on 100 parts by weight of the sum of the nitrile group-containing highly saturated copolymer rubber (a) and the acrylic rubber (d). When the amount of polyamine crosslinking agent (b) is too small, the crosslinking rate and the crosslinking density are liable to be reduced. In contrast, when this amount is too large, a rubber composition tends to have reduced storage stability, and exhibits too high crosslinking density and sometimes gives a brittle crosslinked rubber article.

[Basic Crosslinking Accelerator (c)]

The basic crosslinking accelerator (c) incorporated in the crosslinkable rubber composition (2) is the same as that in the crosslinkable rubber composition (1).

The amount of basic crosslinking accelerator (c) in the crosslinkable rubber composition is in the range of 0.5 to 10 parts by weight, preferably 1 to 7.5 parts by weight and especially 2 to 5 parts by weight, based on 100 parts by weight of the sum of the nitrile group-containing highly saturated copolymer rubber (a) and the acrylic rubber (d). When the amount of basic crosslinking accelerator (c) is too small, the crosslinking rate is liable to become low and the crosslinking density is sometimes reduced. In contrast, when this amount is too large, the crosslinking rate tends to become too high, and scorch is liable to occur and storage stability is occasionally deteriorated.

[Other Ingredients]

Other ingredients can be incorporated in the crosslinkable rubber composition (2). The kind and amount of such ingredients are the same as those which are mentioned above as for the crosslinkable rubber composition (1).

[Method of Preparation of Crosslinkable Rubber Composition]

The crosslinkable rubber compositions (1) and (2) can be prepared by mixing together the above-mentioned ingredients by using an appropriate mixing method such as roll mixing, Banbury mixing, screw mixing or solution mixing. The order of mixing is not particularly limited. For example, ingredients which are stable at a kneading temperature, such as nitrile group-containing highly saturated copolymer rubber (a) and acrylic rubber (d), are first thoroughly kneaded together, and then, an ingredient which readily reacts upon heating, such as polyamine crosslinking agent (c) is kneaded together with the kneaded mixture at a temperature at which the ingredient does not react.

[Crosslinked Rubber Article]

The crosslinked rubber article of the present invention is made by crosslinking the above-mentioned crosslinkable rubber compositions (1) and (2).

[Method for Crosslinking]

The crosslinked rubber article can be made by a method wherein shaping and crosslinking are simultaneously carried or a method wherein shaping is first carried out and then crosslinking is carried out. An appropriate method is chosen depending upon the particular shape of crosslinked article or other factors. The former method of simultaneously carrying out shaping and crosslinking includes, for example, compression molding, transfer molding and injection molding. The latter method of shaping followed by crosslinking includes, for example, a method wherein a resin composition is shaped and then the shaped uncrosslinked rubber article is subjected to steam crosslinking, namely, the shaped uncrosslinked rubber article is placed in a vulcanizing pan and steam is blown therein to heat the rubber article.

The crosslinkable rubber composition of the present invention is crosslinked by heating. The heating temperature is preferably in the range of 130 to 200° C. and more preferably 140 to 200° C. When the heating temperature is too low, a substantially long time is required for crosslinking and the crosslinking density is liable to be reduced. In contrast, when the heating temperature is too high, the crosslinking time is too short and a defective molding is liable to be produced.

After crosslinking, i.e., first crosslinking, the crosslinked rubber article may be subjected to second crosslinking. The crosslinking time for the first crosslinking and the second crosslinking can be chosen based on the crosslinking density and production efficiency depending upon the crosslinking method and temperature and shape of the rubber article. Usually the respective crosslinking times are chosen in the range of 1 minute to 5 hours.

The heating means may be appropriately chosen from those which are employed for crosslinking rubbers and which include, for example, press-heating, steam-heating, oven-heating and hot air-heating.

The crosslinked rubber article of the present invention has high mechanical properties, water resistance and oil resistance, and reduced permanent set. Further, the crosslinking adhesion is high. Therefore, the crosslinked rubber article is used as various automobile rubber parts such as timing belt, hose, gasket, packing and oil seal.

The invention will be explained specifically by the following working examples wherein parts and % are by weight unless otherwise specified. Properties of crosslinked rubber articles were evaluated by the following methods.

(1) Mechanical Properties

A rubber composition was subjected to press-curing (first crosslinking) at 160° C. for 20 minutes under a pressing pressure of 10 MPa and then second curing at 150° C. for 2 hours by a Geer oven to prepare a sheet with a thickness of 2 mm. The sheet was die-cut by a #3 dumbbell die to prepare a press-cured specimen.

A rubber composition was pre-shaped into a sheet with a thickness of 2 mm at 100° C. for 5 minutes under a pressure of 10 MPa. The pre-shaped sheet was subjected to steam curing at 160° C. for 60 minutes in a cure oven and then subjected to second curing at 150° C. for 2 hours by a Geer oven. The cured sheet was die-cut by a #3 dumbbell die to prepare a steam-cured specimen.

Using the press-cured specimen and the steam-cured specimen, tensile strength and 100% tensile modulus were measured according to JIS (Japanese Industrial Standard) K6251, and hardness was measured by using a durometer hardness tester type A according to JIS K6263.

A rubber composition was subjected to press-curing at 160° C. for 30 minutes under a pressing pressure of 10 MPa whereby shaping and crosslinking were simultaneously carried out, and then second curing was carried out at 150° C. for 2 hours by a Geer oven to prepare a press-cured permanent set JIS specimen.

A rubber composition was pre-shaped at 100° C. for 5 minutes under a pressure of 10 MPa, and then subjected to steam-curing at 160° C. for 60 minutes, and further second curing was carried out at 150° C. for 2 hours by a Geer oven to prepare a steam-cured permanent set JIS specimen.

A rubber composition was press-cured at 160° C. for 20 minutes under a pressing pressure of 10 MPa by using a mold having inner diameter of 30 mm and a ring diameter of 3 mm, and then second curing was carried out at 150° C. for 2 hours to prepare a press-cured permanent set O-ring specimen.

Using the above specimens, permanent set was measured according to JIS K6262 under condition A where a specimen was kept in a 25% compressed state at 150° C. for 72 hours, or under condition B where a specimen was kept in a 25% compressed state at 150° C. for 68 hours.

As for rubbers having an acrylic rubber incorporated therein, prepared in Examples 5 to 8 and Comparative Examples 3 and 4, permanent set was evaluated on specimens prepared only by press-curing.

(2) Water Resistance

According to the dipping test method stipulated in JIS K6258, a press-cured rubber specimen was dipped in distilled water at 80° C. for 70 hours, and thereafter, volume change, tensile strength, 100% tensile modulus, elongation and hardness were measured.

(3) Oil Resistance

According to the dipping test method stipulated in JIS K6258, a press-cured rubber specimen was dipped in an automobile engine oil at 150° C. for 72 hours, and thereafter, volume change, tensile strength, 100% tensile modulus, elongation and hardness were measured.

(4) Adhesion to Fiber

Using nitrile group-containing highly saturated copolymer rubber latex (iodine value of rubber: 30, average particle diameter of latex: 0.1 μm, solid content in latex: 40%, bound acrylonitrile content: 36%), a nylon cord (nyon-66, structure 1,890 d/2) was dipped in RFL liquid. The dipped cord was dried at 140° C. for 1 minute and then heat-treated at 230° C. for 1 minute to obtain a treated nylon cord.

The RFL liquid used was prepared by adding 250 parts of the latex, 22.6 parts of 14% aqueous ammonia and 47.9 parts of distilled water to 266 parts of RF liquid, and then aging the obtained mixed liquid at 25° C. for 20 hours. The RF liquid used was prepared by adding 235.8 parts of distilled water to a mixture of 11 parts of resorcin, 16.2 parts of 37% aqueous formaldehyde and 3 parts of 10% aqueous sodium hydroxide solution, and aging the obtained mixed liquid at 25° C. for 6 hours.

A crosslinkable rubber composition was made into an uncrosslinked rubber composition sheet with a thickness of 2.5 mm thickness. The treated nylon cord was laid between two uncrosslinked rubber composition sheets so that 31 cords were laid per 25 mm in parallel at an equal interval, and crosslinking adhesion was carried out 160° C. for 30 minutes to prepare a peeling test specimen.

Using the peeling test specimen, adhesive strength was evaluated by an Instron tensile tester at a separation rate of 50 mm/min.

EXAMPLE 1

A metal bottle was charged with 180 parts of ion-exchanged water, 25 parts of 10% aqueous sodium dodecylbenzenesulfonate solution, 37 parts of acrylonitrile, 2 parts of monoethyl itaconate and 0.5 part of t-dodecylmercaptan as molecular weight modifier in this order. The inner atmosphere was substituted with nitrogen three times, and then 61 parts of butadiene was added.

The metal bottle was maintained at 5° C. and 0.1 part of cumene hydroperoxide as a polymerization initiator was added. Polymerization was carried out for 16 hours while the metal bottle was rotated.

0.1 part of an aqueous 10% hydroquinone solution as a polymerization stopper was added to stop polymerization. Using a rotary evaporator maintained at a water temperature of 60° C., residual monomers were removed to obtain a copolymer rubber latex having a sold content of about 30%. The copolymer rubber was an acrylonitrile-butadiene-unsaturated dicarboxylic acid monoalkyl ester coploymer comprised at 37% of acrylonitrile units, 61% of butadiene units and 2% of monoethyl itaconate units.

In an autoclave the copolymer rubber latex was hydrogenated at 50° C. for 6 hours at a hydrogen gas pressure of 3 MPa by using a palladium catalyst to obtain a nitrile group-containing highly saturated copolymer rubber latex. The palladium catalyst used was prepared by mixing an aqueous 1% palladium acetate solution with an equal amount of ion-exchanged water to prepare a palladium acetate, then dissolving the palladium acetate in acetone, and then adding ion-exchanged water. The amount of palladium catalyst used was 1,000 ppm as palladium by weight based on the dry rubber content in the latex.

To the obtained nitrile group-containing highly saturated copolymer rubber latex, methanol was added to coagulate the latex. The coagulated latex was dried in vacuum at 60° C. for 12 hours to give a nitrile group-containing highly saturated copolymer rubber HNBR1. HNBR1 had an iodine value of 10 and a Mooney viscosity [$ML_{(1+4)}100°$ C.] of 85.

To 100 parts of HNBR1, 1 part of stearic acid, 50 parts of SFR carbon black ("Asahi 50" available from Asahi Carbon K.K.), 5 parts of a plasticizer ("ADKcizer-C-8" available from Asahidenka Kogyo K.K.), 2 parts of 2,2,4-trimethyl-1,2-dihydroquinoline as an age resister, 1.2 parts of hexamethylenediamine carbamate as a polyamine crosslinking agent (hereinafter referred to as "crosslinking agent 1") and 4 parts of di-o-tolylguanidine as a basic crosslinking accelerator (hereinafter referred to as "crosslinking auxiliary 1") to prepare a crosslinkable rubber composition. Properties of the crosslinkable rubber composition and its crosslinked product was evaluated. The results are shown in Table 1 and Table 2.

EXAMPLE 2

By the same procedures as described in Example 1, an acrylonitrile-butadiene-substituted dicarboxylic acid monoalkyl ester copolymer rubber latex was prepared wherein the amounts of monoethyl itaconate and butadiene were changed to 4 parts and 59 parts, respectively, with all other conditions remaining the same. The copolymer was comprised of 37% of acrylonitrile units, 59% of butadiene units and 4% of monoethyl itaconate units. This copolymer was hydrogenated in the same manner as in Example 1 to give HNBR 2. HNBR 2 had an iodine value of 10 and a Mooney viscosity [$ML_{(1+4)}100°$ C.] of 87.

Using HNBR 2 instead of HNBR 1, a crosslinkable rubber composition was made in the same manner as in Example 1 wherein the amount of a polyamine crosslinking agent (crosslinking agent 1) was changed to 2.2 parts with all other conditions remaining the same. Properties of the crosslinkable rubber composition and its crosslinked product were evaluated. The results are shown in Table 1 and Table 2.

EXAMPLE 3

By the same procedures as described in Example 1, an acrylonitrile-butadiene-unsaturated dicarboxylic acid monoalkyl ester copolymer rubber latex was prepared wherein 2.4 parts of monobutyl itaconate was used instead of 2 parts of monoethyl itaconate and the amount of butadiene was changed to 60.6 parts with all other conditions remaining the same. The copolymer was comprised of 37% of acrylonitrile units, 61% of butadiene units and 2% of monobutyl itaconate units. This copolymer was hydrogenated in the same manner as in Example 1 to give HNBR 3. HNBR 3 had an iodine value of 10 and a Mooney viscosity [$ML_{(1+4)}100°$ C.] of 82.

Using HNBR 3 instead of HNBR 1, a crosslinkable rubber composition was made in the same manner and under the same conditions as those in Example 1. Properties of the crosslinkable rubber composition and its crosslinked product were evaluated. The results are shown in Table 1 and Table 2.

EXAMPLE 4

By the same procedure as described in Example 1, an acrylonitrile-butadiene-unsaturated dicarboxylic acid monoalkyl ester copolymer rubber latex was prepared wherein 4.4 parts of monobutyl itaconate was used instead of 2 parts of monoethyl itaconate and the amount of butadiene was changed to 58.6 parts with all other conditions remaining the same. The copolymer was comprised of 37% of acrylonitrile units, 59% of butadiene units and 4% of monobutyl itaconate units. This copolymer was hydrogenated in the same manner as in Example 1 to give HNBR 4. HNBR 4 had an iodine value of 10 and a Mooney viscosity [$ML_{(1+4)}100°$ C.] of 84.

Using HNBR 4 instead of HNBR 1, a crosslinkable rubber composition was made in the same manner as in Example 1 wherein the amount of a polyamine crosslinking agent (crosslinking agent 1) was changed to 2.2 parts with all other conditions remaining the same. Properties of the crosslinkable rubber composition and its crosslinked product were evaluated. The results are shown in Table 1 and Table 2.

COMPARATIVE EXAMPLE 1

By the same procedures as described in Example 1, a crosslinkable rubber composition was made from HNBR 1 wherein 5 parts of an organic peroxide crosslinking agent (1,3-bis(t-butylperoxyisopropyl), hereinafter referred to as "crosslinking agent 2") was used instead of a polyamine crosslinking agent and 2 parts of triallylcyanurate benzene (hereinafter referred to as "crosslinking auxiliary 2") was used instead of a basic crosslinking accelerator (crosslinking auxiliary 1) with all other conditions remaining the same. Properties of the crosslinkable rubber composition and its crosslinked product were evaluated. The results are shown in Table 1 and Table 2.

COMPARATIVE EXAMPLE 2

By the same procedures as described in Example 1, an acrylonitrile-butadiene copolymer rubber latex was prepared wherein monoethyl itaconate was not used and 37 parts of acrylonitrile and 63 parts of butadiene were used with all other conditions remaining the same. The copolymer was comprised of 37% of acrylonitrile units and 63% of butadiene units. This copolymer was hydrogenated in the same manner as in Example 1 to give HNBR 5. HNBR 5 had an iodine value of 10 and a Mooney viscosity [$ML_{(1+4)}100°$ C.] of 86.

Using HNBR 5 instead of HNBR 1, a crosslinkable rubber composition was made in the same manner as in Example 1 wherein 5 parts of an organic peroxide crosslinking agent (crosslinking agent 2) was used instead of a polyamine crosslinking agent and 2 parts of crosslinking auxiliary 2 was used instead of a basic crosslinking accelerator with all other conditions remaining the same. Properties of the crosslinkable rubber composition and its crosslinked product were evaluated. The results are shown in Table 1 and Table 2.

TABLE 1

| Example No. | Ex. 1 | Ex. 2 | Ex. 3 | Ex. 4 | C. Ex. 1 | C. Ex. 2 |
|---|---|---|---|---|---|---|
| Composition (wt. parts) | | | | | | |
| HNBR 1 | 100 | — | — | — | 100 | — |
| HNBR 2 | — | 100 | — | — | — | — |
| HNBR 3 | — | — | 100 | — | — | — |
| HNBR 4 | — | — | — | 100 | — | — |
| HNBR 5 | — | — | — | — | — | 100 |
| Crosslinking agent 1 | 1.2 | 2.2 | 1.2 | 2.2 | — | — |
| Crosslinking agent 2 | — | — | — | — | 5 | 5 |
| Crosslinking auxiliary 1 | 4 | 4 | 4 | 4 | — | — |
| Crosslinking auxiliary 2 | — | — | — | — | 2 | 2 |
| Press Curing | | | | | | |
| Tensile strength (MPa) | 21.1 | 20.4 | 20.6 | 20.2 | 20.3 | 19.0 |
| Elongation (%) | 480 | 320 | 460 | 310 | 500 | 520 |
| 100% Modulus (MPa) | 3.2 | 4.9 | 3.4 | 5.0 | 2.8 | 2.6 |
| Hardness (Duro A) | 66 | 69 | 67 | 69 | 65 | 67 |
| Steam Curing | | | | | | |
| Tensile strength (MPa) | 19.0 | 16.5 | 18.3 | 17.8 | 11.2 | 10.0 |
| Elongation (%) | 490 | 300 | 470 | 290 | 540 | 560 |
| 100% Modulus (MPa) | 2.7 | 4.2 | 2.9 | 4.4 | 2.0 | 1.8 |
| Hardness (Duro A) | 65 | 65 | 66 | 66 | 64 | 64 |
| Water resistance | | | | | | |
| Volume change (%) | 0.2 | 0.4 | 0.3 | 0.6 | 1.0 | 0.3 |
| Tensile strength (MPa) | 20.7 | 20.0 | 19.7 | 19.4 | 16.3 | 18.3 |
| Elongation (%) | 510 | 310 | 490 | 290 | 460 | 520 |
| 100% Modulus (MPa) | 2.8 | 5.0 | 3.1 | 5.1 | 2.6 | 2.5 |
| Hardness (Duro A) | 65 | 65 | 66 | 66 | 63 | 63 |
| Oil resistance | | | | | | |
| Volume change (%) | 0.4 | 0 | 0.7 | 0.2 | 0.4 | 2.5 |
| Tensile strength (MPa) | 20.8 | 17.8 | 19.6 | 18.6 | 18.7 | 18.6 |
| Elongation (%) | 460 | 270 | 440 | 260 | 470 | 380 |
| 100% Modulus (MPa) | 3.2 | 4.9 | 3.4 | 5.2 | 3.0 | 3.6 |
| Hardness (Duro A) | 65 | 67 | 66 | 68 | 64 | 66 |

TABLE 2

| Example No. | Ex. 1 | Ex. 2 | Ex. 3 | Ex. 4 | C. Ex. 1 | C. Ex. 2 |
|---|---|---|---|---|---|---|
| Composition (wt. parts) | | | | | | |
| HNBR 1 | 100 | — | — | — | 100 | — |
| HNBR 2 | — | 100 | — | — | — | — |
| HNBR 3 | — | — | 100 | — | — | — |
| HNBR 4 | — | — | — | 100 | — | — |
| HNBR 5 | — | — | — | — | — | 100 |
| Crosslinking agent 1 | 1.2 | 2.2 | 1.2 | 2.2 | — | — |
| Crosslinking agent 2 | — | — | — | — | 5 | 5 |
| Crosslinking auxiliary 1 | 4 | 4 | 4 | 4 | — | — |
| Crosslinking auxiliary 2 | — | — | — | — | 2 | 2 |
| Permanent set (%) | | | | | | |
| Press Curing | | | | | | |
| Condition A JIS method | 41.0 | 28.1 | 39.2 | 26.1 | 36.6 | 31.0 |
| O-ring method | 48.1 | 33.8 | 42.5 | 31.6 | 74.2 | 70.3 |
| Condition B JIS method | 48.6 | 34.8 | 44.7 | 32.4 | 40.8 | 37.8 |
| O-ring method | 56.2 | 38.6 | 49.2 | 36.7 | 80.3 | 77.4 |
| Steam Curing | | | | | | |
| Condition A JIS method | 43.3 | 30.1 | 41.1 | 28.5 | 74.3 | 70.6 |
| O-ring method | 50.2 | 35.4 | 43.9 | 33.3 | 82.1 | 80.6 |
| Condition B JIS method | 51.4 | 36.4 | 46.9 | 34.1 | 82.3 | 78.8 |
| O-ring method | 59.5 | 40.5 | 52.3 | 39.4 | 90.2 | 86.3 |
| Fiber adhesion test (N/25 mm) | 240 | 250 | 230 | 240 | 210 | 220 |

REFERENCE EXAMPLE 1

A reactor equipped with a thermometer, a stirrer, a nitrogen-introducing tube and a pressure-reducing apparatus was charged with 1,000 parts of ion-exchanged water, 20 parts of sodium dodecylbenzenesulfonate, 10 parts of sodium naphthalenesulfonate, 3 parts of sodium sulfate, 0.2 part of tetrasodium ethylenediaminetetraacetate, 0.005 part of sodium ferric ethylenediaminetetraacetate, 350 parts of ethyl acrylate, 150 parts of butyl acrylate, 470 parts of methoxyethyl acrylate and 30 parts of vinyl chloroacetate. The pH value of the mixture was adjusted to 7, and the temperature of the mixture was reduced to 5° C. with stirring. Deaeration and replacement with nitrogen were repeated whereby oxygen in the inner atmosphere was completely removed.

Then, 0.2 part of sodium thiosulfate, 0.2 part of sodium formaldehydesulfoxylate and 0.1 part of p-methane-hydroperoxide were added to initiate polymerization. While the temperature was maintained at 5° C., polymerization was carried out for 16 hours. The polymerization conversion was about 97%. After completion of polymerization, 5 parts, based on 100 parts of polymer, of calcium chloride was dissolved in ion-exchanged water so that an aqueous calcium chloride solution of a volume equal to a polymerization liquid was prepared. The polymerization liquid was poured little by little into the aqueous calcium chloride solution to coagulate the polymer. The polymer was thoroughly washed with water, and then, dried at 60° C. for 24 hours to obtain acrylic rubber A1. Acrylic rubber A1 had a Mooney viscosity $[ML_{(1+4)} 100° C.]$ of 55.

REFERENCE EXAMPLE 2

By the same procedures as described in Reference Example 1, acrylic rubber A2 was prepared wherein methacrylic acid was used instead of vinyl chloroacetate with all other conditions remaining the same. Acrylic rubber A2 had a Mooney viscosity $[ML_{(1+4)} 100° C.]$ of 50.

EXAMPLE 5

By the same procedures as described in Example 1, a crosslinkable rubber composition was made wherein the amount of HNBR 1 was changed to 70 parts and 30 parts of acrylic rubber A1 was used with all other conditions remaining the same. Properties of a crosslinked product of the crosslinkable rubber composition were evaluated. The results are shown in Table 3.

EXAMPLE 6

By the same procedures as described in Example 1, a crosslinkable rubber composition was made wherein the amount of HNBR 1 was changed to 50 parts and 50 parts of acrylic rubber A1 was used with all other conditions remaining the same. Properties of a crosslinked product of the crosslinkable rubber composition were evaluated. The results are shown in Table 3.

EXAMPLE 7

By the same procedures as described in Example 1, a crosslinkable rubber composition was made wherein 50 parts of HNBR 3 and 50 parts of acrylic rubber A1 were used instead of 100 parts of HNBR 1 with all other conditions remaining the same. Properties of a crosslinked product of the crosslinkable rubber composition were evaluated. The results are shown in Table 3.

EXAMPLE 8

By the same procedures as described in Example 1, a crosslinkable rubber composition was made wherein 50 parts of HNBR 3 and 50 parts of acrylic rubber A2 were used instead of 100 parts of HNBR 1 with all other conditions remaining the same. Properties of a crosslinked product of the crosslinkable rubber composition were evaluated. The results are shown in Table 3.

COMPARATIVE EXAMPLE 3

By the same procedures as described in Example 1, a crosslinkable rubber composition was made wherein acrylic rubber A1 was used instead of HNBR 1 with all other conditions remaining the same. Properties of a crosslinked product of the crosslinkable rubber composition were evaluated. The results are shown in Table 3.

COMPARATIVE EXAMPLE 4

By the same procedures as described in Example 1, a crosslinkable rubber composition was made wherein 50 parts of HNBR 5 and 50 parts of acrylic rubber A1 were used instead of 100 parts of HNBR 1 with all other conditions remaining the same. Properties of a crosslinked product of the crosslinkable rubber composition were evaluated. The results are shown in Table 3.

TABLE 3

| Example No. | Ex. 5 | Ex. 6 | Ex. 7 | Ex. 8 | C. Ex. 3 | C. Ex. 4 |
|---|---|---|---|---|---|---|
| Composition (wt. parts) | | | | | | |
| HNBR 1 | 70 | 50 | — | — | — | — |
| HNBR 3 | — | — | 50 | 50 | — | — |
| HNBR 5 | — | — | — | — | — | 50 |
| Acrylic rubber A1 | 30 | 50 | 50 | — | 100 | 50 |
| Acrylic rubber A2 | — | — | — | 50 | — | — |
| Crosslinking agent 1 | 1.2 | 2.2 | 2.2 | 2.2 | 2.2 | — |
| Crosslinking agent 2 | — | — | — | — | — | 5 |
| Crosslinking auxiliary 1 | 4 | 4 | 4 | 4 | 4 | — |
| Crosslinking auxiliary 2 | — | — | — | — | — | 2 |
| Press Curing | | | | | | |
| Tensile strength (MPa) | 17.9 | 15.8 | 16.1 | 15.2 | 10.6 | 18.0 |
| Elongation (%) | 420 | 380 | 380 | 400 | 280 | 440 |
| 100% Modulus (MPa) | 3.4 | 3.0 | 3.1 | 2.6 | 3.5 | 3.0 |
| Hardness (Duro A) | 66 | 65 | 65 | 64 | 65 | 65 |
| Oil resistance | | | | | | |
| Volume change (%) | 1.2 | 2.0 | 1.8 | 1.2 | 4.3 | 2.5 |
| Tensile strength (MPa) | 15.4 | 13.8 | 14.7 | 13.5 | 18.7 | 16.5 |
| Elongation (%) | 380 | 320 | 340 | 360 | 470 | 380 |
| 100% Modulus (MPa) | 3.7 | 3.4 | 3.4 | 3.0 | 2.5 | 3.6 |
| Hardness (Duro A) | 65 | 64 | 64 | 63 | 62 | 63 |
| Permanent set (%) | | | | | | |
| Press Curing | | | | | | |
| Condition A JIS method | 42.7 | 30.4 | 41.7 | 29.4 | 39.2 | 17.0 |
| O-ring method | 50.1 | 36.5 | 48.7 | 34.2 | 76.3 | 31.0 |
| Condition B JIS method | 49.6 | 34.5 | 46.2 | 34.1 | 42.6 | 22.1 |
| O-ring method | 53.6 | 39.4 | 53.7 | 37.1 | 83.2 | 35.1 |
| Steam Curing | | | | | | |
| Condition A JIS method | 43.1 | 29.8 | 40.7 | 29.3 | 39.6 | 69.2 |
| O-ring method | 50.3 | 35.6 | 49.2 | 33.1 | 56.5 | 73.1 |
| Condition B JIS method | 49.8 | 34.2 | 46.6 | 34.8 | 42.6 | 78.6 |
| O-ring method | 54.1 | 39.5 | 53.9 | 38.5 | 60.2 | 83.2 |

A crosslinked rubber product made by crosslinking a nitrile group-containing highly saturated copolymer rubber containing units of an ethylenically unsaturated dicarboxylic acid monoalkyl ester with a polyamine crosslinking agent and a basic crosslinking accelerator (Examples 1 to 4) exhibits well balanced mechanical strength, water resistance, oil resistance and permanent set and has excellent crosslinking adhesion. Even though the crosslinked rubber product is made by steam-curing, it exhibits excellent properties.

A crosslinked rubber product made by crosslinking a crosslinkable rubber composition comprising a nitrile group-containing highly saturated copolymer rubber containing units of an ethylenically unsaturated dicarboxylic acid monoalkyl ester and an acrylic rubber, with a polyamine crosslinking agent and a basic crosslinking accelerator (Examples 5 to 8), exhibits well balanced mechanical strength, oil resistance and permanent set. Even though the crosslinked rubber product is made by steam-curing, it exhibits excellent properties.

In contrast, a crosslinked rubber product made by crosslinking the nitrile group-containing highly saturated copolymer rubber containing units of an ethylenically unsaturated dicarboxylic acid monoalkyl ester with an organic peroxide crosslinking agent and a crosslinking auxiliary instead of a polyamine crosslinking agent and a basic crosslinking accelerator (Comparative Example 1) has a problem. That is, when crosslinking is carried out by heat-pressing, there is no great difference in crosslinking properties between the crosslinked product of the comparative example and the crosslinked product of the present invention. But, when crosslinking is carried out by steaming, the crosslinked product exhibits undesirably large elongation and reduced 100% tensile modulus. The crosslinked product made by press-curing has poor water resistance and oil resistance, and exhibits undesirably increased variation in properties, especially tensile strength. Further, the permanent set as measured by the O-ring method is larger than that as measured by the JIS method, and the adhesion to fiber is relatively low.

A crosslinked rubber product made by crosslinking HNBR 5 which does not contain units of an ethylenically unsaturated dicarboxylic acid monoalkyl ester with an organic peroxide crosslinking agent and a crosslinking auxiliary instead of a polyamine crosslinking agent and a basic crosslinking accelerator (Comparative Example 2) has a problem. That is, when crosslinking is carried out by steaming, the crosslinked product exhibits undesirably large elongation and reduced 100% tensile modulus. The crosslinked product made by press-curing has poor oil resistance, large volume change, reduced elongation and increased 100% tensile modulus. Further, the permanent set as measured by the O-ring method is larger than that as measured by the JIS method, and the adhesion to fiber is relatively low.

When an acrylic rubber alone is crosslinked with a polyamine crosslinking agent and a basic crosslinking accelerator (Comparative Example 3), a crosslinked product exhibits low tensile strength and low elongation. Further, the crosslinked product exhibits poor oil resistance, large volume change, and large permanent set as measured by the O-ring method.

A crosslinked rubber product made by crosslinking a rubber composition comprising HNBR 5 (which does not contain units of an ethylenically unsaturated dicarboxylic acid monoalkyl ester) and an acrylic rubber, with an organic peroxide crosslinking agent and a crosslinking auxiliary instead of a polyamine crosslinking agent and a basic crosslinking accelerator (Comparative Example 4) has a problem in that a steam-cured product has a permanent set larger than that of press-cured product.

INDUSTRIAL APPLICABILITY

The crosslinked rubber article of the present invention has high mechanical properties, water resistance and oil resistance, and reduced permanent set. Further, the crosslinking adhesion is high. Therefore, the crosslinked rubber article is used especially as various automobile rubber parts such as timing belt, hose, gasket, packing and oil seal.

What is claimed is:

1. A crosslinkable rubber composition comprising:
   (a) 100 parts by weight of a nitrile group-containing highly saturated copolymer rubber containing units of an ethylenically unsaturated dicarboxylic acid monoalkyl ester monomer,
   (b) 0.5 to 10 parts by weight of a polyhydrazide crosslinking agent, and
   (c) 0.5 to 10 parts by weight of a basic crosslinking accelerator.

2. The crosslinkable rubber composition according to claim 1, wherein the content of units of an ethylenically unsaturated dicarboxylic acid monoalkyl ester monomer in the nitrile group-containing highly saturated copolymer rubber (a) is in the range of 0.5% to 15% by weight.

3. The crosslinkable rubber composition according to claim 1, wherein the nitrile group-containing highly saturated copolymer rubber (a) has an iodine value not larger than 120.

4. The crosslinkable rubber composition according to claim 1, wherein the ethylenically unsaturated dicarboxylic acid monoalkyl ester monomer is selected from a maleic acid monoalkyl ester, a fumaric acid monoalkyl ester and an itaconic acid monoalkyl ester.

5. The crosslinkable rubber composition according to claim 4, wherein the ethylenically unsaturated dicarboxylic acid monoalkyl ester monomer is an itaconic acid mono-n-butyl ester.

6. The crosslinkable rubber composition according to claim 1, wherein the polyhydrazide crosslinking agent (b) is selected from the group consisting of an aliphatic polyamine, an aromatic polyamine and a compound having at least two structures represented by the formula —CONHNH$_2$.

7. The crosslinkable rubber composition according to claim 1, wherein the basic crosslinking accelerator (c) is selected from the group consisting of a guanidine crosslinking accelerator and an aldehydeamine crosslinking accelerator.

8. A crosslinkable rubber composition comprising:
   (a) 100 parts by weight of a nitrile group-containing highly saturated copolymer rubber containing units of an ethylenically unsaturated dicarboxylic acid monoalkyl ester monomer;
   (d) 10 to 90 parts by weight of an acrylic rubber; and, based on 100 parts by weight of the sum of the nitrile group-containing highly saturated copolymer rubber (a) and the acrylic rubber (d),
   (b) 0.5 to 10 parts by weight of a polyhydrazide crosslinking agent and
   (c) 0.5 to 10 parts by weight of a basic crosslinking agent.

9. The crosslinkable rubber composition according to claim 8, wherein the content of units of an ethylenically unsaturated dicarboxylic acid monoalkyl ester monomer in the nitrile group-containing highly saturated copolymer rubber (a) is in the range of 0.5% to 15% by weight.

10. The crosslinkable rubber composition according to claim 8, wherein the nitrile group-containing highly saturated copolymer rubber (a) has an iodine value not larger than 120.

11. The crosslinkable rubber composition according to claim 8, wherein the ethylenically unsaturated dicarboxylic acid monoalkyl ester monomer is selected from the group consisting of a maleic acid monoalkyl ester, a fumaric acid monoalkyl ester and an itaconic acid monoalkyl ester.

12. The crosslinkable rubber composition according to claim 11, wherein the ethylenically unsaturated dicarboxylic acid monoalkyl ester monomer is an itaconic acid mono-n-butyl ester.

13. The crosslinkable rubber composition according to claim 8, wherein the acrylic rubber (d) comprises acrylic acid ester monomer units and crosslinking monomer units, wherein the total amount of acrylic acid ester monomer units and the crosslinking monomer units is at least 70% by weight based on the acrylic rubber (d).

14. The crosslinkable rubber composition according to claim 8, wherein the acrylic rubber (d) comprises acrylic acid ester monomer units and crosslinking monomer units, wherein the amount of the acrylic acid ester monomer units is in the range of 90% to 99.5% by weigh based on the sum of the acrylic acid ester monomer units and the crosslinking monomer units.

15. The crosslinkable rubber composition according to claim 8, wherein the polyhydrazide crosslinking agent (b) is selected from the group consisting of aliphatic polyamines, aromatic polyamines and compounds having at least two structures represented by the formula —CONHNH$_2$.

16. The crosslinkable rubber composition according to claim 8, wherein the basic crosslinking accelerator (c) is selected from the group consisting of a guanidine crosslinking accelerator and an aldehydeamine crosslinking accelerator.

17. A crosslinked rubber article made by crosslinking a crosslinkable rubber composition as claimed in claim 1.

* * * * *

UNITED STATES PATENT AND TRADEMARK OFFICE
CERTIFICATE OF CORRECTION

| | |
|---|---|
| PATENT NO. | : 6,657,014 B1 |
| APPLICATION NO. | : 10/049612 |
| DATED | : December 2, 2003 |
| INVENTOR(S) | : Osamu Mori et al. |

It is certified that error appears in the above-identified patent and that said Letters Patent is hereby corrected as shown below:

Col.17, in Claim 1, line 6:

"a polyhydrazide" should read --a polyamine or polyhydrazide--.

Col.17, in Claim 6, line 2:

"the polyhydrazide" should read --the polyamine or polyhydrazide--.

Col.18, in Claim 8, line 10:

"a polyhydrazide" should read --a polyamine or polyhydrazide--.

Col.18, in Claim 15, line 2:

"the polyhydrazide" should read --the polyamine or polyhydrazide--.

Signed and Sealed this

Twenty-fifth Day of December, 2007

JON W. DUDAS
*Director of the United States Patent and Trademark Office*